Patented Dec. 1, 1953

2,661,331

UNITED STATES PATENT OFFICE 2,661,331

PHOTOPOLYMERIZATION PROCESS

Edward G. Howard, Jr., Wilmington, Del., assignor to E. I. du Pont de Nemours & Company, Wilmington, Del., a corporation of Delaware No Drawing. Application February 1, 1950, Serial No. 141,865

8 Claims. (Cl. 204—158)

This invention relates to the addition polymerization of polymerizable organic compounds and more particularly to new polymerization catalyst systems.

Polymerization of ethylenically unsaturated compounds is a process of great technical importance. Generally employed as polymerization catalysts are compounds containing directly linked oxygen atoms such as benzoyl peroxide or potassium persulfate. In conventional polymerization systems, relatively high temperatures are required to obtain high rates of conversion of the monomeric unsaturate to a polymer. The use of elevated temperatures often leads to products of inferior qualities. In some instances where appreciable rates of polymerization have been achieved at lower temperatures, the products obtained have superior physical properties which are of substantial economic importance, such as, for example, the increased abrasion resistance of synthetic rubbers prepared at temperatures which are low. Accordingly, new and improved systems of low temperature addition polymerization in high conversion are of considerable interest.

This invention has as an object the provision of a new polymerization process. Other objects will appear hereinafter.

These objects are accomplished by the following invention wherein compounds subject to addition polymerization by reason of a non-aromatic carbon to carbon double bond are polymerized, with the aid of light, in an aqueous system containing a salt of an organic diazosulfonic acid and a metallic ion such as copper. The salt of the diazosulfonic acid is preferably an ammonium salt of an aromatic diazosulfonic acid.

The following examples in which parts are by weight are illustrative of the invention.

Example I

A. A glass vessel was charged with 13.2 parts of acrylonitrile, 220 parts of water, 0.24 part of ammonium benzenediazosulfonate and 0.04 part of cupric chloride dihydrate. The vessel was flushed with oxygen-free nitrogen, stoppered and placed under a 15-watt white fluorescent lamp. After eight hours at 25° C. an emulsion was obtained which consisted of 4.97% solids which had a particle size of about ⅜ micron. Filtration removed the polymer (12.5 parts corresponding to a 95% conversion) which had a relative viscosity of 1.132 measured on 0.1 g. of polymer in 100 ml. of dimethylformamide. The polymer contained 0.13% copper.

B. When the general procedure of Example IA was repeated except that 0.48 part of ammonium benzenediazosulfonate was used and no copper salt was present, only a 9% conversion of monomer to polymer was obtained in contrast to the high yield of Example IA.

Example II

When the general procedure of Example IA was repeated except that smaller amounts of catalysts were present (0.1 part of ammonium benzenediazosulfonate and 0.008 part of cupric chloride), a 72% conversion of monomer to polymer was obtained.

Example III

A. When the general procedure of Example IA was repeated with the exceptions that in place of 220 parts of water a solution of 120 parts of water and 100 parts of ethyl alcohol was present, and the illumination was with a 100-watt AH-4 sun lamp at —20° C. for two hours, a 37% conversion of monomer to polymer was obtained.

B. The general procedure of Example IA was repeated except that in place of the cupric salt, the following salts were employed in separate experiments: nickel nitrate (10%), silver nitrate (17%), cobaltous chloride (11%), mercuric acetate (8%), chromium nitrate (10%), lead acetate (17%), bismuth trichloride (13%), cadmium chloride (7%), and sodium bisulfite (5%). The figures in parentheses after the individual salts represent the conversions of monomer to polymer which were obtained therewith in five hours at 28° C. With ferric chloride a 56% conversion was obtained while with ferrous sulfate a 34% conversion was obtained. It is evident that silver and lead are somewhat effective as promoters and that copper and ferrous and ferric iron are very effective. Substitution of the ammonium benzenediazosulfonate by azobenzene or azibenzil gave less than 5% polymer.

Example IV

A. A glass container was charged with 12.5 parts of methyl methacrylate, 50 parts water, 40 parts of ethyl alcohol, 0.12 part of ammonium benzenediazosulfonate, 0.2 part of cupric chloride dihydrate. After illumination for one hour at 30° C. by a white fluorescent lamp, 9.3 parts of polymer (corresponding to a 74% conversion) was obtained which contained 126 p. p. m. of copper and had a relative viscosity of 1.248 as measured on a 0.2 g. in 100 ml. of solution of ethylene chloride at 25° C.

B. When the general procedure of Example IVA was repeated except that in separate experiments (a) the ammonium benzenediazosulfonate was not present, (b) both the sulfonate and cupric salt were omitted, and (c) no illumination was present. In these experiments, no polymerization occurred. When the copper salt was absent, a 49% yield of polymer was obtained in five hours.

*Example V*

The general procedure of Example IVA was repeated except that smaller amounts of catalyst were employed. When 0.0024 part of ammonium benzenediazosulfonate and 0.002 part of cupric chloride dihydrate was used, a 62% yield of high molecular weight polymer was obtained in three hours. With 0.024 part of ammonium benzenediazosulfonate and 0.0022 part of cupric chloride, there was obtained a 93% yield of polymer in one hour.

*Example VI*

A glass vessel was charged with 15.6 parts of vinyl chloride, 50 parts of water, 40 parts of ethyl alcohol, 0.12 part of ammonium benezenediazosulfonate and 0.02 part of cupric chloride dihydrate. After illumination with a white fluorescent lamp for five hours at 28° C., a 31% conversion of polymer was obtained.

When the cupric chloride was omitted, less than 4% yield of polymer was obtained.

The ammonium benzenediazosulfonate employed in the above examples was prepared according to Paal and Kretschmer, Ber. 27, 1244 (1894). The aromatic diazosulfonates may be prepared by the reaction of the appropriate diazonium salt, e. g. the chloride, with potassium acid sulfite. See Sidgwick, Organic Chemistry of Nitrogen, 1942, page 418.

The process of this invention is of generic application to the addition polymerization of polymerizable compounds having the non-aromatic or ethylenic, $>C=C<$ group. It is applicable to monomeric unsaturated polymerizable compounds in which the unsaturation is due to a terminal ethylenic group which is attached to a negative radical. It is thus applicable to polymerizable vinylidene compounds, including vinyl compounds and particularly preferred are those which contain the $CH_2=C<$ group.

Compounds having a terminal methylene which are subject to polymerization and copolymerization include olefins, e. g., ethylene, isobutylene; acrylyl and alkacrylyl compounds, e. g., acrylonitrile, methyl acrylate, ethyl methacrylate, methacrylamide; vinyl and vinylidene halides, e. g., vinyl fluoride, vinylidene chloride; vinyl carboxylates, e. g., vinyl acetate, vinyl trimethylacetate; vinyl imides, e. g., N-vinylphthalimide, N-vinyllactams, e. g., N-vinylcaprolactam, vinyl aryls such as styrene and other vinyl derivatives such as vinylpyridine, methyl vinyl ketone and vinyl ethyl ether.

Polyfluoroethylenes, including tetrafluoroethylene, chlorotrifluoroethylene and 1,1-dichloro-2,2-difluoroethylene may be polymerized and copolymerized by the process of this invention.

Polymerizable compounds that have a plurality of ethylenic double bonds that may be polymerized or copolymerized include those having conjugated double bonds, such as butadiene and 2-chlorobutadiene, and compounds which contain two or more double bonds which are isolated with respect to each other, such as ethylene glycol dimethacrylate, methacrylic anhydride, diallyl maleate and divinyl benzene.

In addition to copolymers obtainable from the classes of monomers mentioned above, the copolymerization of fumaric or maleic esters with types of monomers mentioned, may be effected by the process of this invention. Furthermore, the term "polymerization" is meant to include within its scope, in addition to the polymerization of a monomer alone or of two or more monomers, i. e., copolymerization, the polymerization of unsaturated monomer in the presence of a chain transfer agent, e. g., carbon tetrachloride. The latter has been called "telomerization."

This invention is applicable to the polymerization of any unsaturated compound subject to addition polymerization by prior techniques. Optimum conditions may vary from monomer to monomer and since liquid phase polymerization is desired, gases such as ethylene and propylene require pressure.

The polymerizations are usually carried out at −20° C. to 60° C. Lower temperatures may be used; however the rate of polymerization is generally not high enough for commercial interest. Higher temperatures may be used particularly when the time of polymerization is to be kept at a minimum, e. g., in a continuous process. Although this invention may be practiced over a wide temperature range, optimum results are obtained in liquid aqueous systems at 0–40° C. In general, the time required for substantial polymerization depends upon other variables such as the specific temperature and concentrations of monomer, catalyst, etc. Times of from 1–24 hours are customarily employed.

The polymerization may be carried out by conventional means. Liquid medium in which the catalyst, monomer, and diluent are uniformly distributed, i. e., a homogeneous system is customarily used and generally aqueous systems are employed in view of the more uniform rate obtained when the catalysts are soluble in the polymerizing medium.

Although both aromatic and aliphatic diazosulfonates may be employed, in view of availability, aromatic diazosulfonates are preferred. The mononuclear aromatic diazosulfonates and particularly those wherein the diazosulfonic acid group is attached to an aryl radical are particularly preferred. Although the ammonium salt has been illustrated in the examples, other salts, e. g., the potassium salt, may also be used. The amount of sulfonate present may vary widely. In general, amounts of 0.01 to 5% based on the weight of polymerizable monomer may be used.

The cupric ion is generally present in small amounts, e. g., 0.001 to 20% based on the weight of aryl diazosulfonate. In addition to cupric chloride, other cupric salts, e. g., cupric sulfate, may be used as the source of the cupric ion. As indicated above ions of the other metallic elements of atomic number of 26 to 29 can be used but polyvalent ions of copper and iron are preferred.

Light in the visible region, e. g., of wave lengths 3200 Å. to 7000 Å., unexpectedly increases the speed of polymerization. The source of the light may be natural or artificial.

The catalysts employed in the process of this invention are stable and nonoxidizing. The polymerization system is particularly advantageous when high rates of conversion of monomer to polymer at low temperature are desired.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for polymerizing an ethylenically unsaturated monomer subject to addition polymerization which comprises irradiating, with light in the range 3200–7000 Å., an aqueous dispersion containing said monomer, cupric ion, and a soluble salt of an aromatic diazosulfonic acid.

2. Process for polymerizing an ethylenically unsaturated monomer subject to addition polymerization which comprises irradiating, with light in the range 3200–7000 Å., an aqueous dispersion containing said monomer, cupric ion, and a soluble salt of a mononuclear aromatic diazosulfonic acid.

3. Process for polymerizing an ethylenically unsaturated monomer subject to addition polymerization which comprises irradiating, with light in the range 3200–7000 Å., an aqueous dispersion containing said monomer, cupric ion, and a soluble salt of an aromatic diazosulfonic acid wherein the diazosulfonic acid group is attached to an aryl radical.

4. Process for polymerizing an ethylenically unsaturated monomer subject to addition polymerization which comprises irradiating, with light in the range 3200–7000 Å., an aqueous dispersion containing said monomer, cupric ion, and a soluble salt of benzenediazosulfonic acid.

5. Process of claim 1 wherein the monomer is a vinylidene compound.

6. Process of claim 1 wherein the monomer is a vinyl compound.

7. Process for polymerizing an ethylenically unsaturated monomer subject to addition polymerization which comprises irradiating, with light in the range 3200–7000 Å., an aqueous dispersion containing said monomer, polyvalent ion of the class consisting of cupric, ferric, and ferrous ions, and a soluble salt of an aromatic diazosulfonic acid.

8. Process for polymerizing an ethylenically unsaturated monomer subject to addition polymerization which comprises irradiating, with light in the range 3200–7000 Å., an aqueous dispersion containing said monomer, polyvalent ion of the class consisting of cupric, ferric, and ferrous ions, and a soluble salt of an aryl diazosulfonic acid.

EDWARD G. HOWARD, Jr.

References Cited in the file of this patent

UNITED STATES PATENTS

| Number | Name | Date |
|---|---|---|
| 1,891,203 | Ambros et al. | Dec. 13, 1932 |
| 2,344,785 | Owens et al. | Mar. 21, 1944 |
| 2,375,987 | Garvey | May 15, 1945 |
| 2,376,014 | Semon et al. | May 15, 1945 |
| 2,471,959 | Hunt | May 31, 1949 |
| 2,527,393 | Brown | Oct. 24, 1950 |

OTHER REFERENCES

Ellis et al., Chemical Action of Ultraviolet Rays (1941), pp. 409–411.